United States Patent [19]

Seeboth et al.

[11] Patent Number: 4,842,375

[45] Date of Patent: Jun. 27, 1989

[54] METHOD FOR THE ORIENTATION OF LIQUID CRYSTALS

[75] Inventors: Arno Seeboth; Joerg Gloede; Hans-Dieter Koswig; Horst Ladwig; Hartwin Obernik; Helmuth Seeboth, all of Berlin, German Democratic Rep.

[73] Assignee: VEB.Werk fuer Fernsehelektronik im VEB Kombinat Mikroelektronik, Berlin, German Democratic Rep.

[21] Appl. No.: 72,074

[22] Filed: Jul. 10, 1987

[30] Foreign Application Priority Data

Sep. 4, 1986 [DD] German Democratic Rep. ... 294147

[51] Int. Cl.$^4$ ............................................. G02F 1/13
[52] U.S. Cl. ............................... 350/339 R; 350/341
[58] Field of Search ............................. 350/339 R, 341

[56] References Cited

U.S. PATENT DOCUMENTS 4,618,514  10/1986  McClelland et al. ............... 350/341

FOREIGN PATENT DOCUMENTS 2406350  8/1974  Fed. Rep. of Germany ...... 350/341
0007749  1/1977  Japan ................................. 350/341

OTHER PUBLICATIONS

Kahn, Frederic and Gary Taylor and Harold Schonhorn, "Surface-Produced Alignment of Liquid Crystals," *Proceedings of the IEEE*, vol. 61, No. 7, Jul. 1973, pp. 823–828.

*Primary Examiner*—Stanley D. Miller
*Assistant Examiner*—Anita E. Pellman
*Attorney, Agent, or Firm*—Jordan and Hamburg

[57] ABSTRACT

The orientation of a thermotropic LC volume is achieved by means of thermotropic LC molecules firmly bonded chemically to a matrix. The orientation takes place due to the physical and chemical properties of the LC volume, chemically bonded to the matrix on the disordered LC volume. Hydrocarbon polymers or organosilanes are used as the matrix, to the functional groups of which the thermotropic liquid crystal molecules, which also have functional groups suitable for bonding to the matrix, are chemically linked. The chemically linked thermotropic LC may be a nematic, cholesterinic, discotic or smectic LC, with which nematic, cholesterinic, discotic or smectic LC volumes can be oriented. The matrix is chemically bonded covalently to the substrate surface and may be colored due to additional coupling of reactive dyes.

14 Claims, No Drawings

METHOD FOR THE ORIENTATION OF LIQUID CRYSTALS

BACKGROUND OF THE INVENTION

The method relates to a method for the orientation of liquid crystals in liquid crystal displays (LCD), in which a liquid crystal layer is tightly enclosed hermetically between two transparent electrodes and at a inner electrode surface of which an orienting layer for the specific spatial orientation of the liquid crystals (LC) is linked by a chemical bond.

In any LCD, the liquid crystal, in the unstressed state, must have a specific starting orientation, which is as heat resistant as possible and has a long operational life. This starting orientation may be obtained, for example, by means of depositing vapors at an angle under vacuum on the transparent electrodes. $SiO_x$, C, Au, $Al_2O_3$ and $TiO_2$, as well as organic compounds, are used for this purpose. When organic compounds are applied, the bond of the orienting layer to the substrate is not assured. In particular, this method is not suitable for the orientation of liquid crystals on large substrate surfaces, since the uniformity of the vapor deposition angle on the substrate surface no longer is present. For this purpose, vapor-deposition facilities with a large diameter would be required in order to have a sufficient distance between the vaporization source and the substrate. To achieve a particular tilt angle between the liquid crystal and the substrate surface, a double vapor deposition at an angle is even required.

The application of organic orienting layers on the transparent electrodes with the necessary, subsequent mechanical processing, has gained international acceptance. For example, silane compounds of the $X_n SiR_{4-n}$ type (see German Offenlegungsschrift No. 2,635,630), hydrocarbon polymers such as polyvinyl alcohol (see German Offenlegungsschrift No. 2,406,350), or heat-resistant polyamides by a screen-printing method (see U.S. Pat. No. 4,278,326), by photoresist methods (see German Offenlegungsschrift No. 2,931,259), or by dipping methods with subsequent heating (German Auslegeschrift No. 2,638,091), are applied in this manner. Colored orienting layers, obtained by admixing dyes (for example, German Offenlegungsschrift No. 3,016,396), or by coupling reactive dyes to the orienting layer (as described in DD Pat. No. 221,024), are also known.

The orientation of smectic liquid crystals by vapor deposition at an angle and under vacuum, or by means of hydrocarbon polymers, is described in German Offenlegungsschriften Nos. 3,443,011 and 3,502,160. A permanent bond between the polymeric orienting layer and the substrate surface of the type described in DD Pat. No. 218,195 and U.S. Pat. No. 4,472,028, as a prerequisite for a time- and temperature-independent qualitative LC orientation, is not taken into consideration in these patents.

The teachings of German Offenlegungsschriften Nos. 3,513,437, 3,427,597 and 3,508,169, with regard to the orientation of smectic LC, all relate to the transfer of known methods to the orientation of nematic LC on smectic liquid crystals. All previous methods for the orientation of liquid-crystalline molecules are based on characteristically deforming the surface geometry of the substrates by vapor deposition under vacuum, mechanically processing an inorganic or organic surface film, hydrophobizing and hydrophilizing, so as to give the LC molecule the desired spatial position in this manner.

Aside from orientation by surface geometry, physical and chemical interactions between the substrate surface and the LC cannot be excluded. Their controlling effect on the orientation of the LC cannot, however, be determined accurately in advance, as was noted by T. Uchida et al. in Mol. Cryst. Liq. Cryst. 60 (1980) 37-52.

SUMMARY OF THE INVENTION

An objective of the invention is the uniform single crystalline orientation of thermotropic liquid crystals in large-area LCDs high quality and long operational life.

It is another object of the invention to provide a method for the orientation of liquid crystal molecules at the substrate surface.

In accordance with the invention, the objectives are achieved by a method wherein, for the orientation of liquid crystal molecules on the substrate surface, a matrix is applied, to the functional groups of which, in some cases, thermotropic liquid crystals are linked before application on the substrate surface. The matrix is bound directly, permanently and chemically, or by way of a coupling agent, to the substrate surface, which consists, for example, of glass or polymer.

Functional groups of the matrix, which are still free, can be utilized for further specific reactions, for example, for bonding reactive dyes. The orienting—also colored—matrix, permanently bonded to the substrate surface, is readily soluble in low boiling solvents having good wetting properties, so that it can be applied by means of a dipping method. Other methods that can be employed are screen printing, centrifuging, spraying, etc.

DETAILED DESCRIPTION OF THE PREFERRED EMBODIMENTS

Hydrocarbon polymers, which may also have hetero atoms in the chain, or organosilanes of the general type $X_n SiR_{4-n}$, wherein X represents a hydrolyzable group and R an organofunctional group, are used as the matrix.

If a matrix, such as polyvinyl alcohol, is used, which itself cannot be linked by chemical bonds to the substrate surface, a coupling agent is used. Preferably, copolymers of maleic acid or of maleic anydride, copolymers of acrylic acid or of acrylic anhydride and copolymers of methacrylic acid or methacrylic anhydride are used as the hydrocarbon polymer matrix. Aside from these, polymers of only one monomer may also be used.

Pursuant to the invention, nematic, cholesterinic, discotic, smectic and/or chiral liquid crystals forming smetic c phases can be bound to the matrix. Accordingly, nematic, cholesterinic, discotic and smectic LC layers can be subsequently be oriented. It is advantageous if the liquid crystal, which is added to the matrix, forms the same phase as the liquid crystal to be oriented, for example, a matrix with liquid crystals with a smetic phase for liquid crystals with a smectic phase.

This is, however, not a general prerequisite. Very different combinations are possible between the individual classes and subclasses, such as smectic a, c c*, g, h. The important advantage over known methods of orienting LC lies in that the orientation of the LC layer in the LCD is accomplished not by a geometric processing of the surface or by a change in its surface tension;

rather, the orientation of the LC layer is accomplished with liquid crystal molecules, which are linked by chemical bonds to a matrix.

Pursuant to the invention, the orientation of the LC volume is accomplished through the transfer of anisotropic orientation forces by means of thermotropic LC molecules, which are linked by chemical means to the substrate surface.

The nematic, cholesterinic, discotic or smectic liquid crystals are chemically bonded through functional groups to the reactive groups of the matrix in such a manner that the chemical structure of the LC molecules is not changed or changed only insignificantly, that is, so that the liquid crystalline, anisotropic character is retained.

If the LC molecules do not have suitable functional groups for bonding to the matrix, such groups are introduced into the LC molecules without affecting the physical and chemical properties significantly.

To obtain the inventive, quasi, liquid crystalline orientation layer, LC molecules are added on to 20-80%, preferably 50-70%, of the reactive groups of the matrix. The remaining reactive groups of the matrix are utilized in known manner for stable, chemical bonding to the substrate surface. This stable bonding of the matrix is achieved by the chemical reaction of functional groups of the matrix with the partially hydrolyzed surface of the substrate.

Further free functional groups of the matrix can be used for specific reactions. For example, reactive dyes can be coupled in known manner to these functional groups, in order to obtain colored, quasi liquid crystalline orientation layers. In this connection, it is sufficient if reactive dyes enter into an addition reaction with 3-5% of the functional groups of the matrix.

The quasi crystalline orientation layers, prepared in accordance with the invention, have the following general structure I.

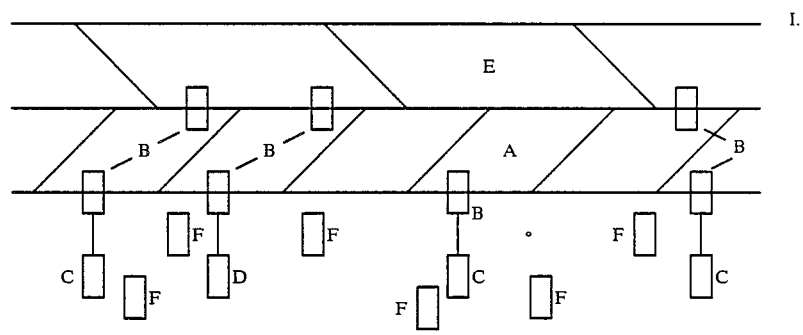

For fixing the LC molecule to the hydrocarbon polymer matrix, the degree to which the matrix reacts with the LC molecules is determined by the molar ratio of the LC to the functional groups of the hydrocarbon polymer. When a monomeric starting matrix is used, such as in the case of silane compounds, the extent of the reaction depends on the ratio of the monomeric or oligomeric organosilanes used, to which an LC molecule is coupled, to the unreacted organosilanes.

The extent of the reaction of the matrix with the LC molecules must be high enough, so that there is a sufficiently high degree of order at the interface-quasi liquid crystalline orientation layer/LC volume. In the ideal case, the orientation layer has the same degree of order as the LC volume.

A thermotropic liquid crystal C is fixed to the bulk of functional groups B of a matrix A. Reactive dyes D can enter into an addition reaction with other functional groups B, which are still free, or, above all, secure the stable chemical bond to a substrate surface E. By means of the anisotropic properties of the bound LC molecules C, this matrix A orients a liquid crystal layer F, which protrudes into the cell.

If a matrix, based on a organosilane of the general type $SiX_nR_{4-n}$, wherein X is a hydrolyzable group (for example, an alkoxy or a halogen group) and R is an organic group, and also containing a thermotropic LC molecule (C), is used as an orientation layer, for example:

1. Molecule Y

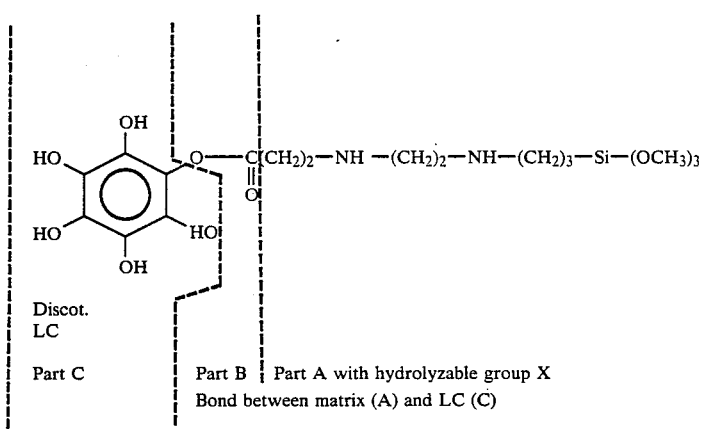

Discot. LC — Part C | Part B | Part A with hydrolyzable group X
Bond between matrix (A) and LC (C)

2. Molecule Z

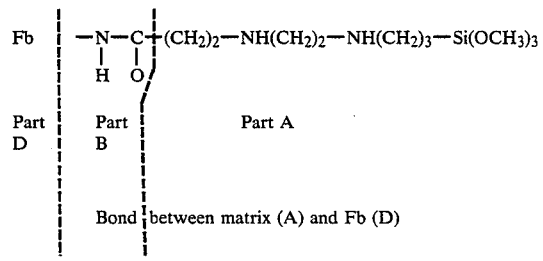

Part D | Part B | Part A

Bond between matrix (A) and Fb (D)

Part D = Reactive Dye, e.g., and

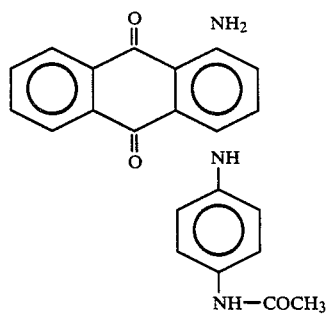

acid pale blue

3. Molecule T

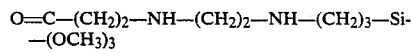

unreacted organosilane (γ-aminosilane), a polysiloxane of the following structure is obtained from the molecules Y, Z and T, dissolved in a solvent in a ratio, for example, of 20:1:5.

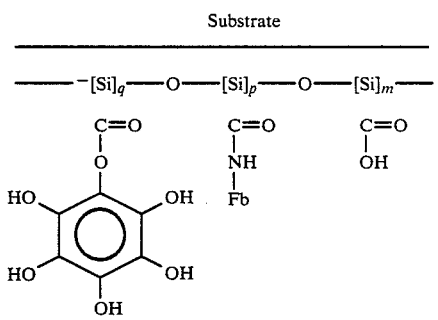

A colored (blue), quasi discotic liquid crystalline orientation layer is obtained for the orientation of discotic LC layers. Hexaphenol is the LC molecule (C).

If a matrix based on a hydrocarbon polymer is used as the orientation layer, which forms a chemical bond with the substrate surface, for example:

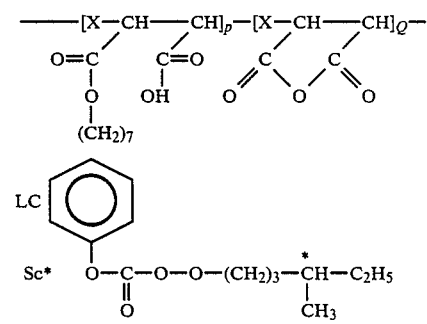

a p:q ratio of, for example, 6:4 is used, in which part p of the molecule represents a polymer part with a chemically bound smectic chiral liquid crystal and part q of the molecule represents a polymer part with free functional groups for bonding to the substrate surface. A matrix with the above structure is obtained, wherein X represents a comonomer in the maleic anhydride copolymer, vinyl monomers being preferred (e.g. ethylene, propylene, vinyl acetate, isobutyl vinyl ether, styrene, etc.)

By such means, a thermostable, quasi smectic orienting layer, which is firmly bonded chemically to the substrate surface, is obtained for the orientation of smectic LC layers. 4-Heptylphenyl-4-(4''-methylhexyl)-biphenyl-4'-carboxylate of the formula

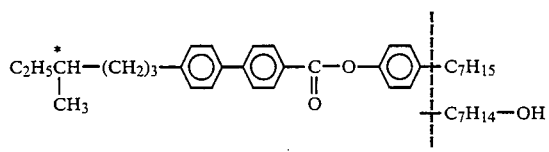

is bonded to the matrix as chiral, smectic LC.

If a portion of the functional anhydride groups (in the Q part of the molecule), which are still free, is reacted with a reactive dye (Fb), a colored, quasi smectic, liquid crystalline orienting layer of the following structure is obtained:

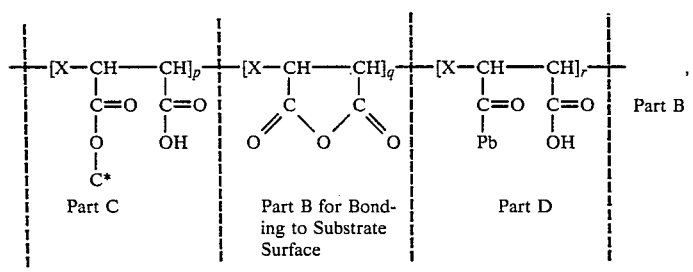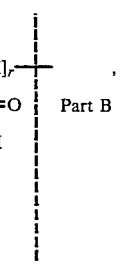

a p:q:m ratio of 18:10:2 being used.

If a matrix based on a hydrogen polymer, such as polyvinyl alcohol, which itself cannot form a chemical bond with the substrate surface, is used as an orienting layer, a coupling agent is employed to ensure stable adhesion of the orienting layer to the substrate surface.

A cyano-substituted biphenyl, bonded to the matrix over a $-(CH_2)_n$ storage group, is used as nematic LC. A matrix with the following structure is obtained:

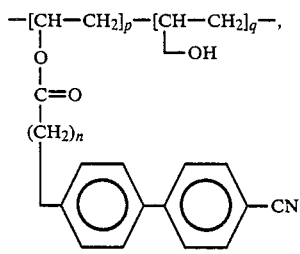

in which the ratio of p:q is 5:1.

The orientation layers, produced by the method of the invention, can also be formed by a dipping process, by spraying, by screen printing, etc., on the substrate surface through the transparent electrodes. The thickness of the orientation layer on the surface depends on the technology. It is between 50 and 500 Å.

EXAMPLE

The invention will be explained in greater detail through the following examples.

EXAMPLE 1

For use as transparent electrode supporting plates, glass panes are vapor-coated on one side with an electrically conductive film of $SnO_2/In_2O_3$. A desired pattern is produced by the usual methods. To protect the electrode film, an $SiO_2$ film is then vapor deposited, or an $SiO_x$ film is applied from solution by dipping. Subsequently, the substrates are dipped in a 2% solution of a γ-aminoalkylsilane, which has previously been reacted with hexaphenol (10 parts) as LC and acid pale blue (1 part) as reactive dye. The solvent mixture consists of methanol/ethyl acetate/isobutanol (6:3:1). The substrates, so treated, are subjected to cell construction. The uniform, single crystalline orientation of the discotic LC layer, enclosed in the cell, becomes visible in a polarization microscope.

EXAMPLE 2

Transparent electrode plates, like those described in Example 1, are immersed in a 0.5% solution of a maleic anhydride/vinyl acetate copolymer, the anhydride groups of which are reacted to the extent of 60% with the chiral smectic LC molecule

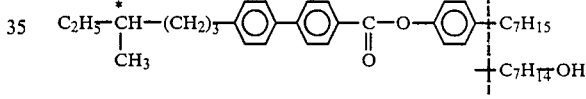

over an ester group and which is dissolved in a solvent mixture (methanol:ethyl acetate:isobutanol=4:4:1). After the immersion procedure, the substrates are dried for 20 minutes at 50° C. The substrates, so treated, are assembled into cells and the intercellular gap of less than 2 μm is filled with a chiral smectic LC. The smectic LC layer is oriented uniformly.

We claim:

1. A method for orienting liquid crystals uniformly on a substrate surface, comprising bonding thermotropic liquid crystals to a portion of functional groups of a matrix of a copolymer of maleic acid and maleic anhydride, and then linking the matrix as an orienting layer to a substrate surface.

2. A method for orienting liquid crystals uniformly on a substrate surface, comprising bonding thermotropic liquid crystals to a portion of functional groups of a matrix of a copolymer of monomers including a monomer selected from the group consisting of methacryllic acid and methacrylic anhydride, and then linking the matrix as an orienting layer to a substrate surface.

3. A method for orienting liquid crystals uniformly on a substrate surface, comprising bonding thermotropic liquid crystals to a portion of functional groups of a matrix of a polymer of a single monomer, the polymer including a carbon atom-containing chain and hydrogen atoms pendent from said carbon atoms, and then linking the matrix as an orienting layer to a substrate surface.

4. A method for orienting liquid crystals uniformly on a substrate surface, comprising bonding thermotropic liquid crystals to a portion of functional groups of a matrix of polyvinyl alcohol, and then through a coupling agent linking the matrix as an orienting layer to a substrate surface.

5. A method for orienting liquid crystals uniformly on a substrate surface, comprising bonding thermotropic liquid crystals to a first portion of the functional groups of a matrix, chemically bonding reactive dyes to a second portion of the functional groups of the matrix, and then linking the matrix as an orienting layer to a substrate surface.

6. A method as in claim 5, wherein reactive dyes are chemically bonded to 1 to 30% of the functional groups of the matrix.

7. A method as in claim 6, wherein reactive dyes are chemically bonded to 2 to 4% of the functional groups of the matrix.

8. A liquid crystal display comprising a substrate having a surface, a matrix of a copolymer of maleic acid and maleic anhydride, said matrix being linked to the substrate surface and having functional groups, and thermotropic liquid crystals bonded to at least some of the functional groups of the matrix, whereby the thermotropic liquid crystals are oriented uniformly on the substrate surface.

9. A liquid crystal display comprising a substrate having a surface, a matrix of a copolymer of monomers including a monomer selected from the group consisting of methacrylic acid and methacrylic anhydride, said matrix being linked to the substrate surface and having functional groups, and thermotropic liquid crystals bonded to at least some of the functional groups of the matrix, whereby the thermotropic liquid crystals are oriented uniformly on the substrate surface.

10. A liquid crystal display comprising a substrate having a surface, a matrix of a polymer of a single monomer, the polymer including a carbon atom-containing chain and hydrogen atoms pendent from said carbon atoms, said matrix being linked to the substrate surface and having functional groups, and thermotropic liquid crystals bonded to at least some of the functional groups of the matrix, whereby the thermotropic liquid crystals are oriented uniformly on the substrate surface.

11. A liquid crystal display comprising a substrate having a surface, a matrix of polyvinyl alcohol, said matrix having functional groups and being linked to the substrate surface through a coupling agent, and thermotropic liquid crystals bonded to at least some of the functional groups of the matrix, whereby the thermoplastic liquid crystals are oriented uniformly on the substrate surface.

12. A liquid crystal display comprising a substrate having a surface, a matrix linked to the substrate surface, the matrix having functional groups, thermotropic liquid crystals bonded to a first portion of the functional groups of the matrix, and reactive dyes chemically bonded to a second portion of the functional groups of the matrix, whereby the thermotropic liquid crystals are oriented uniformly on the substrate surface.

13. A liquid crystal display as in claim 12, wherein reactive dyes are chemically bonded to 1 to 30% of the functional groups of the matrix.

14. A liquid crystal display as in claim 13, wherein reactive dyes are chemically bonded to 2 to 4% of the functional groups of the matrix.

* * * * *